United States Patent [19]

Bissot

[11] Patent Number: 4,595,476
[45] Date of Patent: Jun. 17, 1986

[54] ION EXCHANGE MEMBRANES PRE-EXPANDED WITH DI- AND POLY ETHER-GLYCOLS

[75] Inventor: Thomas C. Bissot, Newark, Del.

[73] Assignee: E. I. Du Pont de Nemours and Company, Wilmington, Del.

[21] Appl. No.: 634,779

[22] Filed: Jul. 26, 1984

[51] Int. Cl.$^4$ .................. C25B 9/00; C25B 13/00; C08D 5/20
[52] U.S. Cl. .................. 204/252; 204/263; 204/296; 521/27; 521/28; 521/33
[58] Field of Search .................. 521/33, 27, 28; 204/252, 296

[56] References Cited

U.S. PATENT DOCUMENTS

| | | | |
|---|---|---|---|
| 4,000,057 | 12/1976 | Muazek et al. | 204/296 |
| 4,174,426 | 11/1979 | Asami et al. | 521/27 |
| 4,200,538 | 4/1980 | Seita et al. | 521/27 |
| 4,270,996 | 6/1981 | Suhara et al. | 204/98 |
| 4,376,030 | 3/1983 | Ezzell et al. | 204/296 |

FOREIGN PATENT DOCUMENTS 51-73991  6/1976  Japan.
52-72398  6/1977  Japan.
58-163446  9/1983  Japan.

OTHER PUBLICATIONS

Research Disclosure, Feb. 1982, pp. 32–34.
Technology of Solvents & Plasticizers–Doolittle, 1956, John Wiley & Sons, p. 667.

Primary Examiner—Joseph L. Schofer
Assistant Examiner—Peter F. Kulkosky

[57] ABSTRACT

Pre-swelled ion exchange membranes formed from one or more layers of fluorinated polymer having carboxylic or sulfonic acid functional groups and which polymer contains about 8 to 30% by weight of a swelling agent of the formula $HO(CH_2CHYO)_nH$ where $Y=H$ or $CH_3$ and $n=2$, 3 or 4 are disclosed. Also disclosed are processes for preparing these membranes, electrochemical cells utilizing these membranes, and methods of preparing said cells for use in chloralkali processes.

28 Claims, No Drawings

ION EXCHANGE MEMBRANES PRE-EXPANDED WITH DI- AND POLY ETHER-GLYCOLS

BACKGROUND OF THE INVENTION

This invention relates to pre-expanded cation exchange membranes, processes for making such membranes, electrochemical cells utilizing such membranes, and methods for preparing said cells for use in chloralkali processes.

Ion exchange membranes formed from fluorinated polymers having carboxylic acid and/or sulfonic acid functional groups are known in the art. A principal use of such membranes is in chloralkali electrolysis cells. Ion exchange membranes tend to swell when they come into contact with cell electrolytes, resulting in wrinkling of the membranes and poor cell performance. Accordingly, it is desirable to install the membrane in an expanded condition which will revert to a taut state when the cell operating liquors are present.

A number of approaches for pre-expanding membranes have been suggested in the art. Japanese Patent Application No. 52-72398, published on June 16, 1977, discloses that chloralkali cell membranes can be swelled prior to installation in the cell by immersing them in a "hydrophilic solvent," with or without added water. Suggested solvents are alcohols, aldehydes, ketones, acids, esters, amides, amines and nitriles, and specific examples to isopropyl/alcohol, ethylene glycol, dimethylacetamide, tetrahydrofuran and ethanol are provided. In each instance, the membrane, after being immersed in the solvent for a period of time, was wiped dry and immediately placed in the chloralkali cell. There was no indication that the pre-swelled membrane could be stored for any period of time.

Another approach is described in *Research Disclosure*, February 1982, pp 32–34. Here it is suggested that the membrane be swelled with water, brine, caustic, lower alcohols, glycols or mixtures thereof.

U.S. Pat. No. 4,376,030, issued to Ezzell et al. on Mar. 8, 1983, discloses a method for providing fluoropolymer ion-exchange membranes with dimensional stability by treating the membranes with at least one liquid amine to form amine salts, then drying and storing the membranes.

U.S. Pat. No. 4,270,996, issued to Suhara et al. on June 2, 1981, discloses that wrinkling of fluorinated polymer membranes can be alleviated by treating the membranes with a base or salt to obtain a specified weight gain which depends on ion exchange capacity (IEC). The weight gains range from 2% at IEC 0.5 to 50% at IEC 2.0.

Japanese Patent Application No. 58-163446, published on Sept. 28, 1983, discloses swelling unreinforced membranes to a linear magnification of more than 1.1, then restraining and drying. The swelling agent may be monohydricalcohols such as methanol, ethanol, propanol and butanol, dihydric alcohols such as ethylene glycol and propylene glycol, trihydric alcohols such as glycerine, ethers sucn as methyl and ethyl ethers, and nitriles such as acetonitrile.

Another publication of possible relevance is Japanese Patent Application No. 51-73991, published on June 26, 1976. This application does not speak in terms of "pre-swelling" cation exchange membranes but rather in terms of improving the cation-to-anion selectivity of the membranes. This is done by incorporating in the molecule, in the interior, and/or on the surface of the fluorocarbon membrane a polymer $(CX_2CXY)_nO)_m$, where X=H or halogen, Y=H, halogen, $CH_3$ or its halogen substitution product, n=1 or 2 and m=an integer of 2 or higher.

Despite the various methods described above for pre-swelling or otherwise improving fluorocarbon cation exchange membranes, the common practice is still to presoak the membrane in dilute solutions of salts or bases (e.g., 2% $NaHCO_3$ or NaOH) prior to installation in the electrolytic cell. Precautions must be taken to insure that the membranes do not dry out before or after installation in the cell. Thus, the membrane must be immediately installed in the cell after expansion is complete and, after installation, the cell must be kept wet. This is disadvantageous as it involves an additional, complicated process step at the point of cell assembly. Another disadvantage is that the wet membranes may cause corrosion of the electrodes, especially iron cathodes, before cell start-up.

SUMMARY OF THE INVENTION

A new method for pre-swelling fluorinated polymer cation-exchange membranes has now been found which avoids the problems inherent in many of the various prior art methods. This invention therefore relates to an optionally reinforced, pre-expanded cation-exchange membrane comprising one or more layers of fluorinated polymer whose functional groups are selected from $-CO_2M$ and $-SO_3M$ where M is H, Na or K, and which polymer contains about 8 to 30% by weight of a swelling agent or mixture of swelling agents of the formula $HO(CH_2CHYO)_nH$ where Y=H or $CH_3$ and n=2, 3 or 4. This novel membrane is superior to unexpanded membrane in that it does not expand and wrinkle after installation in an electrolytic cell. The membrane also exhibits excellent storage stability and current efficiency.

This invention also relates to processes for making and using the above-described membranes.

DETAILED DESCRIPTION

The pre-expanded membrane of the present invention is prepared from fluorinated polymers which have carboxylic acid and/or sulfonic acid functional groups.

The carboxylic polymers (i.e., polymers with carboxylic acid functional groups) with which the present invention is concerned have a fluorinated hydrocarbon backbone chain to which are attached the functional groups or pendant side chains which in turn carry the functional groups. When the polymer is in melt-fabricable form, the pendant side chains can contain, for example,

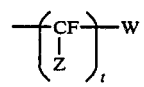

groups wherein Z is F, $CF_3$ or $CF_2Cl$, preferably F, t is 1 to 12, and W is —COOR or —CN, wherein R is lower alkyl. Preferably, the functional group in the side chains of the polymer will be present in terminal

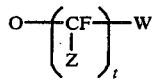

groups wherein t is 1 to 3.

By "fluorinated polymer" is meant a polymer in which, after loss of any R group by hydrolysis to ion exchange form, the number of F atoms is at least 90% of the total number of F, Cl and H atoms in the polymer. For chloralkali cells, perfluorinated polymers are preferred, though the R in any COOR group need not be fluorinated because it is lost during hydrolysis.

Polymers containing

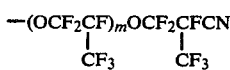

side chains, in which m is 0, 1, 2, 3 or 4, are disclosed in U.S. Pat. No. 3,852,326.

Polymers containing $-(CF_2)_nCOOR$ side chains, where n is 1 to 18, are disclosed in U.S. Pat. No. 3,506,635.

Polymers containing

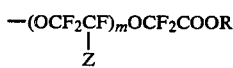

side chains, where Z and R have the meaning defined above and m is 0, 1, or 2 (preferably 1) are disclosed in U.S. Pat. No. 4,267,364.

Polymers containing terminal $-O(CF_2)_nW$ groups, where W is as defined above and n is from 2 to 12, are preferred. They are disclosed in U.S. Pat. Nos. 3,641,104, 4,178,218, 4,116,888, British Pat. Nos. 2,053,902A, and 1,518,387. These groups may be part of

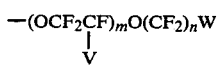

side chains, where V is F, $CF_3$ or $CF_2Cl$. Especially preferred are polymers containing such side chains where n is 2, which are described in U.S. Pat. No. 4,138,426 and S. Afr. 78/002225, and where n is 3, which are described in U.S. Pat. No. 4,065,366. Among these polymers, those with m=1 and V=$CF_3$ are most preferred. Polymers with side chains wherein V is $CF_2Cl$ are disclosed in European patent publication 41737.

The above references describe how to make these polymers.

The sulfonyl polymers (i.e. polymers having sulfonic acid functional groups) with which the present invention is concerned are fluorinated polymers with side chains containing the group

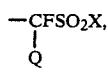

wherein Q is F, Cl, a $C_1$ to $C_{10}$ perfluoroalkyl radical, or $CF_2Cl$, and X is F or Cl, preferably F. (These formulae are for the melt fabricable form of the polymers). Ordinarily, the side chains will contain $-OCF_2CF_2CF_2SO_2X$ or $-OCF_2CF_2SO_2F$ groups, preferably the latter. The term "fluorinated polymer" carries the same meaning as employed above in reference to carboxylate polymers. For use in chloralkali membranes, perfluorinated copolymers are preferred.

Polymers containing the side chain

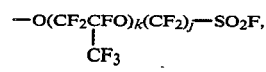

where k is 0 or 1 and j is 3, 4, or 5, may be used. These are described in British No. 2,053,902A.

Polymers containing the side chain $-CF_2CF_2SO_2X$ are described in U.S. Pat. No. 3,718,627.

Preferred polymers contain the side chain

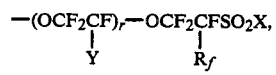

where X is as defined above, Y is F or $CF_3$, r is 1, 2, or 3, and $R_f$ is F, Cl, or a $C_1$ to $C_{10}$ perfluoroalkyl radical, most preferably F, and are described in U.S. Pat. No. 3,282,875. Especially preferred are copolymers containing the side chain

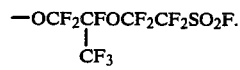

Polymerization can be carried out by the methods described in the above references. Especially useful is solution polymerization using $ClF_2CCFCl_2$ solvent and $(CF_3CF_2COO-)_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

In addition to using separate films of the above-defined polymers, it is also possible to use a laminar film of two or more layers in making the membrane. For example, a film having a layer of a copolymer having sulfonyl groups in melt-fabricable form and a layer of a copolymer having carboxyl groups in melt-fabricable form, such as made by coextrusion, can be used in making the membrane of the invention.

The copolymers used in the layers described herein should be of high enough molecular weight to produce films which are self-supporting in both the melt-fabricable precursor form and in the hydrolyzed ion exchange form.

The customary way to specify the structural composition of films or membranes in this field of art is to specify the polymer composition, equivalent weight and thickness of the polymer films in melt-fabricable form, and the type of reinforcing fabric, if any, from which the membrane is fabricated. This is done, in the case of both the immediate product membrane of the lamination procedure and the hydrolyzed ion-exchange membrane made therefrom, because (1) the thickness of a fabric-reinforced membrane is not uniform, being thicker at the cross-over points of the reinforcing fabric and thinner elsewhere, and measurement made by calipers or micrometer indicates only the maximum thickness, and (2) in the case of the hydrolyzed ion-exchange membrane, the measured thickness varies depending on whether the membrane is dry or swollen with water or an electrolyte, and even on the ionic species and ionic strength of the electrolyte, even though the amount of polymer remains constant. As the performance of a film or membrane is in part a function of the amount of polymer, the most convenient way to specify structural composition is as stated immediately above.

When used as a component of a membrane to separate the anode and cathode compartments of an electrolysis cell, such as a chloralkali cell, the sulfonate polymers dealt with herein, after conversion to ionizable form, should have an equivalent weight in the range of 600 to 1500. Above 1500 the electrical resistivity becomes too high, and below 600 the mechanical and electrochemical properties are poor because of excessive swelling of the polymer. Preferably the equivalent weight is at least 800. Also, for most purposes, and for layers of such polymer of customary thickness, a value no greater than about 1400 is preferred.

For the carboxylate polymers dealt with herein, when used as a component of a membrane to separate the compartments of a chloralkali cell, the requirements thereof differ from those of the sulfonate polymers. The carboxylate polymer should have an equivalent weight in the range of 670 to 1500. A value below 1250 is preferred, so as to have lower resistance. Additionally, a value of at least 750 is preferred, so as to have good mechanical properties.

The multilayer membranes of the invention are prepared from component polymer films which have a thickness ranging from as low as about 13 microns (0.5 mil) up to about 150 microns (6 mils). As a multilayer membrane will generally be prepared from two or three such polymer films, the total thickness of polymer films used in making the resulting membrane will generally lie in the range of about 50 to 250 microns (2 to 10 mils), preferably 75 to 200 microns (3 to 8 mils), most preferably about 75 to 150 microns (3 to 6 mils).

The membrane may be unreinforced, but for dimensional stability and greater notched tear resistance, it is common to use a reinforcing material. It is customary to use a fabric made of a fluorocarbon resin such as polytetrafluoroethylene or a copolymer of tetrafluoroethylene with hexafluoropropylene (Teflon ® FEP fluorocarbon resin) or with perfluoro-(propyl vinyl ether) (Teflon ® PFA fluorocarbon resin). These may be woven into fabric using various weaves, such as the plain weave, basket weave, leno weave, or others. Relatively open weaves are favorable in that electrical resistance is lower. Porous sheet such as disclosed in U.S. Pat. No. 3,962,153 may be used as a support. Other perhalogenated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make it possible to get more reinforcing action with a thinner overall membrane. It is desirable to use soluble or degradable fibers, such as rayon or polyethylene terephthalate, along with the fluorocarbon fibers, or in place of the fluorocarbon fibers. Care should be taken, however, not to have the soluble or degradable fibers extend from one surface to the other, or the non-porous membrane will become a porous diaphragm and, in the case of a chloralkali cell, the caustic will contain too much salt. Even with a cloth or mesh of fluorocarbon fibers, it is preferred not to have the cloth penetrate the surface of the membrane on the cathode side. The fabric employed may be calendered before lamination to reduce its thickness. In a bimembrane, the fabric may be in the sulfonate or carboxylate layer or both, but is more often in the sulfonate layer, which is usually thicker. In place of fabric, nonwoven fibrils can be used.

The membrane or bimembrane may be used flat in various known filter press cells, or may be shaped around an electrode. The latter is especially useful when it is desired to convert an existing diaphragm cell to a membrane cell in order to make better quality caustic.

A preferred precursor membrane of the invention is that which has a first layer of fluorinated polymer whose functional groups are —COOM (M=H, Na or K) as one surface layer, a second layer of fluorinated polymer whose functional groups are —SO$_3$M (M=H, Na or K) as the other surface layer, said first and second layers being in adherent contact with one another. For use in chloralkali cells, it is preferred that the polymers be perfluorinated. It is also preferred that the membrane be reinforced and the sacrificial members of the web of support material be partially or largely embedded in the second layer. Said first layer has a thickness in the range of about 13 to 75 microns (0.5-3 mils), and said second layer has a thickness in the range of about 75 to 150 microns (3-6 mils). When there are additional layers of fluorinated polymer, these will be between said first and second layers, so that said first and second layers will always be the outermost said layers, and adjacent layers will be in adherent contact with one another.

It is also possible to make reinforced or unreinforced membrane whose constitution with respect to the fluorinated ion-exchange polymer thereof (or precursor polymer thereof) is either (1) a single layer of polymer whose functional groups are —COOM groups or (2) first and second layers of polymer, both being of polymer whose functional groups are —COOM groups, the two layers differing either in equivalent weight only or in chemical composition, with the higher equivalent weight layer or the composition with the lower water absorption forming the first (cathode-facing) layer of the membrane. In each case, such membrane is made such that the sacrificial members of the support material, if any, are in the second (anode-facing) layer of the membrane.

It is also possible to make reinforced or unreinforced membrane whose constitution with respect to the fluorinated ion-exchange polymer thereof (or precursor polymer thereof) is either (1) a single layer of polymer whose functional groups are —SO$_3$M groups or (2) first and second layers of polymer, both being of polymer whose functional groups are —SO$_3$M groups, the two layers differing either in equivalent weight only or in chemical composition, with the higher equivalent weight layer or the composition with the lower water absorption forming the first (cathode-facing) layer of the membrane. In each case, such membrane is made such that the support material, if any, is in the second (anode-facing) layer of the membrane.

It is also possible to make reinforced or unreinforced membrane whose constitution with respect to the fluorinated ion-exchange polymer thereof (or precursor polymer thereof) is either (1) a single layer of polymer whose functional groups are —SO$_3$M groups and whose cathode-facing surface has been chemically converted to carboxyl groups, or (2) first and second layers of polymer, both being of polymer whose functional groups are —SO₃M groups, the two layers differing either in equivalent weight only or in chemical composition, with the higher equivalent weight layer or the composition with the lower water absorption forming the first (cathode-facing) layer of the membrane and whose cathode-facing surface has been chemically converted to carboxyl groups. In each case, such membrane is made such that the support material, if any, is in the second (anode-facing) layer of the membrane.

The membranes described herein may be modified on either or both surfaces so as to have enhanced gas release properties, for example, by providing optimum surface roughness or, preferably, by providing thereon a gas- and liquid-permeable porous non-electrode layer. Such layer may function to facilitate release of bubbles and is sometimes referred to as a bubble release layer. It can be attached, detached or integral.

The pre-swelled cation-exchange membranes of this invention are prepared by incorporating into the fluorocarbon polymer membranes as described above one or more of certain swelling agents. Suitable swelling agents are of the formula

$$\mathrm{HO(CH_2CHYO)}_n\mathrm{H}$$

where
  Y=H, CH₃ and
  n=2, 3 or 4.

Preferred swelling agents are diethylene glycol, triethylene glycol and dipropylene glycol-1,2. The total content of the swelling agent(s) in the membrane should be about 8–30 percent by weight, preferably about 10–20% for reinforced membranes and 10–25% for unreinforced membranes, the base line being air-dried untreated membrane.

The degree of swelling of the membranes can also be measured by the lineal expansion of the membrane. The lineal expansion of the pre-swelled membrane, compared with the original air-dried state, is expressed as % expansion and is calculated by averaging the expansion in the machine direction (MD) and the transverse direction (TD). Measurements of the pre-swelled membrane are taken after the membrane has equilibrated at ambient temperature and approximately 50% relative humidity for a period of about two hours. For the pre-swelled membranes of this invention, the lineal expansion should be at least about 5%. For practical purposes, the upper limit for lineal expansion is in the range of about 15%. Unreinforced membranes will be able to expand more than reinforced membranes. Preferably, the lineal expansion for reinforced membranes is about 7–11% and for unreinforced membranes is about 7–13%.

To prepare the pre-swelled membranes, the acid or potassium or sodium salt form of the fluorinated polymer is contacted with a solution of swelling agent or mixture of swelling agents for a period of time long enough to provide, after air drying, a lineal expansion of at least about 5%. Aqueous solutions of the swelling agent are preferred, although other polar solvents such as lower (C₁-C₄) alcohols may also be used. The concentration of swelling agent in solution should be about 12–70 weight percent. When the swelling agent is diethylene glycol, it is preferred that the solution be 20–50 weight %, and when the agent is dipropylene glycol or triethylene glycol, it is preferred that the solution be 15–40 weight %.

The temperature and time of the soaking treatment are not critical so long as the required lineal expansion is achieved. Room temperature soaking for fifteen minutes is usually adequate. The soaked membrane may be blotted to remove excess surface liquid. Other methods are to blow off surface liquid with an air stream or to drain in a vertical position. After removal of the excess surface liquid, the sheet is air-dried at room temperature for two hours or for a shorter time at elevated temperature to remove the bulk of the water, leaving the glycol in the expanded sheet. If a solvent other than water is used above, a longer drying period may be necessary.

The acid or sodium or potassium salt form of the fluorinated polymer, which is the form which is pre-expanded according to this invention, is prepared by hydrolysis of the melt-fabricable form of the polymer with acid or the appropriate alkali metal hydroxide. Use of hot solutions, such as near the boiling point of the solution, is preferred for rapid hydrolysis. The time required for hydrolysis increases with the thickness of the structure. It is also of advantage to include a water-miscible organic compound such as dimethyl sulfoxide (DMSO) in the hydrolysis bath, to swell the membrane to increase the rate of hydrolysis.

A principal use of the pre-expanded ion exchange membrane of the invention is in electrochemical cells. Such a cell comprises an anode, a compartment for the anode, a cathode, a compartment for the cathode, and a membrane which is situated to separate the two said compartments. One example is a chloralkali cell, for which the membrane should have the functional groups in salt form; in such a cell, a layer of the membrane which has carboxylic functional groups will be disposed toward the cathode compartment.

The electrochemical cell, especially a chloralkali cell, will ordinarily be constructed such that the gap or spacing between the anode and cathode is narrow, i.e., no greater than about 3 mm. It is also often advantageous to operate the cell and electrolysis process with the membrane in contact with either the anode or cathode, which can be accomplished with the aid of an appropriate hydraulic head in one cell compartment, or by using an open mesh or grid separator to urge the membrane and selected electrode into contact. It is often further advantageous for the membrane to be in contact with both the anode and cathode in an arrangement referred to as a zero-gap configuration. Such arrangements offer advantages in minimizing the resistance contributed by the anolyte and catholyte, and thus providing for operation at lower voltage. Whether or not such arrangements are used, either or both electrodes can have an appropriate catalytically active surface layer of type known in the art for lowering the overvoltage at an electrode.

One great advantage of the pre-swelled membranes of this invention, as previously alluded to, is their excellent storage stability. Test results presented in the examples below indicate that shrinking of the pre-swelled membranes in storage is minimal. Another advantage of these membranes is that at least one complicated step is eliminated from the cell start-up process. Previously, a party using a new fluorocarbon cation-exchange membrane in an electrolysis cell had to "pre-swell" the membrane immediately before installing it in the cell to avoid wrinkling of the membranes when cell operation commences. The novel membranes of this invention may be dry-mounted in the cell; no presoaking is necessary. Because of this, new cells may also be pre-assembled and stored or shipped, providing for greater efficiency and labor savings in the job of assembling the cell.

After the pre-swelled membranes of this invention are installed in chloralkali cells, it is desirable to remove the swelling agent from the membrane prior to cell start-up to reduce contamination of the product caustic by swelling agent and to reduce foaming at cell start-up. One method for removing the swelling agent is a simple pre-wash. Water or an aqueous solution of brine is placed in the anode compartment of the cell and water or an aqueous solution of caustic is placed in the cathode compartment of the cell. The solutions are allowed to simultaneously remain in the cell for a period of time sufficient to remove substantially all (defined as approximately 90%) of the swelling agent from the membrane, typically for about fifteen minutes or more at room temperature, and are then removed. Higher temperatures may be used but, at temperatures above about 40° C., damage to other cell components can occur. The pre-wash procedure may then be repeated until the desired amount of swelling agent is removed. It is estimated that each pre-wash removes about 90% of the remaining swelling agent in the membrane, so two pre-washes should suffice to remove 99% of the swelling agent.

One preferred pre-wash method involves using relatively dilute solutions, i.e., about 2–10%, of brine and caustic in the process described above. It is estimated that, using this method, roughly half of the extracted swelling agent is extracted into the brine, and half into the caustic. After the desired number of repetitious of the pre-wash procedure, the dilute brine and caustic solutions in the cell are replaced with cell-strength solutions and cell operation can be commenced.

In still another preferred method, dilute, i.e. about 2–10%, brine is placed in the anode compartment and cell-strength, i.e. about 30–35%, caustic is placed in the cathode compartment. The advantage of this method is that most of the swelling agent is extracted into the brine in the anode compartment. It is estimated that only about 10% of the swelling agent extracted in each pre-wash using this method is extracted into the caustic. Thus, although one might want to remove the caustic after the first pre-wash, subsequent pre-washes could be effected by merely removing and replacing the brine in the anode compartment. So little swelling agent will be extracted into the caustic after the first pre-wash that the caustic can be retained in the cell and used when cell operation commences.

The membranes of this invention and processes for making them are illustrated in the following examples.

EXAMPLE 1

A 10.2×10.2 cm (4×4 inch) KOH-hydrolyzed sample of a laminate of a copolymer of tetrafluoroethylene and $CF_2=CF-O-CF_2-CF-(CF_3)-O-CF_2-COO-CH_3$ (equivalent weight 1050, thickness 38 microns) and a copolymer of tetrafluoroethylene and $CF_2=CF-O-CF_2-CF(CF_3)-O-CF_2-CF_2-SO-F$ (equivalent weight 1080, thickness 125 microns) reinforced with a fabric woven of tetrafluoroethylene and polyethylene terephthalate fibers, was the starting material. It was soaked in 50% aqueous diethylene glycol at room temperature for two hours. The lineal expansion (average of MD and TD) was 9.25%, and the glycol content was 12.3%.

EXAMPLE 2

The starting material was made by forming a reinforced laminate from 25 microns of the same carboxyl copolymer used in Ex. 1, 100 microns of a sulfonyl copolymer identical to that in Ex. 1 reinforced with a polytetrafluoroethylene/polyethylene terephthalate fabric. It was hydrolyzed with KOH in aqueous dimethylsulfoxide to give the $K^+$ salt form. Then the membrane was expanded with 50% aqueous diethylene glycol at room temperature for 2 hours, and air dried after which it was coated on the cathode side with $ZrO_2$ particles and a functional binder as taught in U.S. Pat. No. 4,437,951. Lineal expansion was 10.6% and weight increase was 29%, meaning the glycol content was 22.5%. The membrane had a slightly puckered surface due to expansion of film beyond the restraints of the permanent reinforcing fibers. This pre-expanded membrane was mounted in a chloralkali cell and electrolysis was started. Foaming of the catholyte was observed initially, which was attributed to the removal of the diethylene glycol. Foam dispersed after 16 hours of operation. After 6 days of operation the cell was operating at 96.7% CE and 3.08 V. The dry-mounted membrane showed no wrinkling after removal from the test cell. Instead of being mounted immediately, the air-dried pre-expanded membrane could be stored at room conditions for several months exposed to air, or indefinitely if enclosed in some type of container or overwrap.

EXAMPLE 3

The reinforced laminate starting material of Example 2 was hydrolyzed in a continuous process to give the $Na^+$ salt form and washed in line to remove DMSO and excess alkali. The sheet was then immersed in a bath containing 26% diethylene glycol in water at 33° C. for a contact time of 24 minutes. Excess surface liquid was blown off with an air knife and the sheet was dried with warm air controlled to keep the membrane temperature below 54° C. The glycol content of the membrane was 12%.

After equilibration at 50% relative humidity, the membrane was 8–9% larger in average lineal dimensions than the same material produced without the glycol expansion. This product was flat, without excessive pucker due to overexpansion of film areas between the reinforcing threads. A test piece of this membrane gave 96% current efficiency at 3.00 volts in a laboratory test cell. The used membrane sample was removed and examined after 11 days of operation and found to be very flat and free from wrinkles.

EXAMPLES 4–7

In these experiments, the starting membrane was the same as that used in Example 1. Samples of the membrane were exposed to diethylene glycol solutions of various concentrations for two hours at room temperature. The membrane was then blotted dry and allowed to air dry at room temperature and weighed after various exposure times in a constant (50%) relative humidity room at 22°–23° C. Data are presented in Table I for the weight gain of diethylene glycol together with a small amount of absorbed water as a percentage of the total weight of the membrane.

TABLE I

| | | % Diethylene glycol/Water after exposure | | | | | |
|---|---|---|---|---|---|---|---|
| Example | % diethylene glycol | 1 day | 3 days | 10 days | 19 days | 24 days | 39 days |
| 4 | 40 | 12.8 | 11.3 | 11.1 | 10.2 | 10 | 10 |
| 5 | 50 | 15.5 | 13.9 | 13.0 | 12.0 | 12.3 | 11.6 |
| 6 | 60 | 17.8 | 16.2 | 15.9 | 15.0 | 14.1 | 13.9 |
| 7 | 70 | 21.3 | 19.4 | 18.7 | 17.6 | 17.1 | 16.5 |

For comparison, a piece of the same membrane used in Examples 4–7 was immersed in a mixture of 50% Prestone ® antifreeze (ethylene glycol) and 50% water at 90° C. for 15 minutes, causing a lineal expansion of 11.45% and an aqueous glycol content of 21.6%. The sample was exposed in a constant humidity room at 22°–23° C. and 50% relative humidity for 24 hours, and then measured and weighed, showing the lineal expansion was only 6.25% and the aqueous glycol content was 13.5%.

The sample was then hung in a laboratory over a hot and rather humid weekend. At the end of 96 hours it was again measured and weighed, showing the lineal expansion was only 3.3% and the aqueous glycol content was only 5.3%. The sample was puckered and curled. This comparison clearly shows the superior storage characteristics of the diethylene glycol-swelled membranes of this invention over similar ethylene glycol-swelled membranes.

EXAMPLE 8

Samples of the diethylene glycol-swelled membrane of Example 2 and a control membrane which received no glycol treatment were tested in the MIT Folding Endurance Test (ASTM D2176) to determine the effect of glycol treatment on flex endurance. The results are presented in Table II and illustrate that the pre-swelled membrane of this invention exhibits far superior flex endurance than the untreated control.

TABLE II

| Membrane | Number of Flexes |
|---|---|
| Diethylene-glycol treated | 10,000 |
| No treatment; dried at 50% relative humidity | 4614, 2645 |

EXAMPLES 9–11

The starting membrane of Example 2 was treated with various swelling agents as set forth below in Table III. The membranes were also coated on the cathode side with $ZrO_2$ particles and a functional binder as in Ex. 2. The membranes were then placed in chloralkli cells and electrolysis was started. Data for these membranes, and for the membrane of Ex. 2, are presented in Table III.

TABLE III

| | SWELLING AGENT | | LINEAL EXPANSION % | % GLYCOL IN DRIED PRODUCT | ELECTROLYSIS | | |
|---|---|---|---|---|---|---|---|
| EXAMPLE | IDENTITY | % IN WATER | | | DAYS | CE % | CELL VOLTAGE |
| 2 | diethylene glycol | 50 | 10.6 | 22.5 | 6 | 96.7 | 3.08 |
| 9 | triethylene glycol | 40 | 10.6 | 18.6 | 3 | 96.5 | 3.08 |
| 10 | tetraethylene glycol | 40 | 10.6 | 19.5 | 6 | 96.2 | 3.18 |
| 11 | dipropylene glycol-1,2 | 25 | 10.6 | 13.9 | 5 | 95.8 | 3.06 |
| Control | None | 0 | 7.5 | 0 | | 96.2 | 3.08 |

Each of the membranes in Table III were observed after several days' operation in the cell and found to be free of wrinkles. Thes examples show that these reinforced and coated pre-expanded membranes of this invention exhibit current efficiencies and voltage substantially as good as or better than the untreated control.

EXAMPLES 12–13

Using the same starting membrane as Example 1, the following additional experiments were performed. In these examples, as in all following examples, data was obtained from using the membranes in a chloralkali cell.

TABLE IV

| | SWELLING AGENT | | LINEAL EXPANSION % | % GLYCOL IN DRIED PRODUCT | ELECTROLYSIS | | |
|---|---|---|---|---|---|---|---|
| EXAMPLE | IDENTITY | % IN WATER | | | DAYS | CE % | CELL VOLTAGE |
| A | ethylene glycol | 50 | 8.5 | NA | 6 | 94.2 | 3.70 |
| B | Polyethylene glycol (MW = 300) | — | — | — | 6 | 91.9 | 3.30 |
| 12 | diethylene glycol | 50 | 9.8 | 13 | 8 | 96.5 | 3.57 |
| 13 | tetraethylene glycol-1,2 | 40 | 10.6 | 18 | 8 | 96.8 | 3.55 |
| Control | None | 0 | 3–5 | 0 | | 96 | 3.50 |

NA = not available

Each of the membranes in Table IV were observed after several days' operation in the cell and found to be free of wrinkles. These examples show that these reinforced, uncoated, pre-swelled membranes of this invention (Examples 12 and 13) exhibit current efficiencies superior to the untreated control and to membranes pre-treated with either ethylene glycol or polyethylene glycol of MW = 300.

EXAMPLES 14-16

The starting membrane in these experiments was an unreinforced membrane with 38 microns of the carboxyl copolymer of Ex. 1 coextruded with 100 microns of the sulfonyl copolymer of Ex. 1 and hydrolyzed with KOH in DMSO/water at 90° C. to the K+ salt form. After swelling, the cathode (carboxyl) side of the membrane was coated with $ZrO_2$ bubble release agent as in Example 2.

TABLE V

| | SWELLING AGENT | | | % GLYCOL | ELECTROLYSIS | | |
| EXAMPLE | IDENTITY | % IN WATER | LINEAL EXPANSION % | IN DRIED PRODUCT | DAYS | CE % | CELL VOLTAGE |
| --- | --- | --- | --- | --- | --- | --- | --- |
| 14 | diethylene glycol | 50 | 10.3 | 17 | 11 | 96.7 | 3.21 |
| 15 | triethylene glycol | 40 | 10.9 | 15.1 | 8 | 90.9 | 3.19 |
| 16 | tetraethylene glycol | 40 | 10.6 | 17.9 | 6 | 89 | 3.10 |
| Control | None | 2 | | 0 | | 96.5 | 3.08 |

All of the membranes were observed after several days' operation in the cell and found to be free of wrinkles. These examples show that these particular diethylene glycol-treated, coated, unreinforced membranes of this invention exhibit current efficiencies superior to that of the untreated control. In this particular example, the triethylene and tetraethylene glycol treated membranes did not exhibit current efficiencies quite as high as the untreated controls.

EXAMPLES 17-22

In these examples, the starting membrane of Example 1 was used. After pre-expansion, however, each membrane was coated on the carboxyl (cathode) side with $ZrO_2$ particles in a functional binder as taught in U.S. Pat. No. 4,437,951.

TABLE VI

| | SWELLING AGENT | | | % GLYCOL | ELECTROLYSIS | | |
| EXAMPLE | IDENTITY | % IN WATER | LINEAL EXPANSION % | IN DRIED PRODUCT | DAYS | CE % | CELL VOLTAGE |
| --- | --- | --- | --- | --- | --- | --- | --- |
| 17 | tetraethylene glycol | 40 | 11.3 | 18.8 | 7 | 93.7 | 3.19 |
| 18 | triethylene glycol | 40 | 10.2 | 20.4 | 7 | 97.0 | 3.25 |
| 19 | diethylene glycol | 50 | 9.5 | 15.8 | 7 | 97.0 | 3.25 |
| 20 | dipropylene glycol-1,2 | 25 | 8.3 | 12.1 | 3 | 96.5 | 3.30 |
| 21 | diethylene glycol | 50 | 9.0 | 16.0 | 7 | 95.3 | 3.23 |
| 22 | dipropylene glycol-1,2 | 25 | 6.6 | 8.3 | 8 | 96.0 | 3.29 |
| Control | None | 0 | | 0 | | 96.0 | 3.14 |
| A | 300 molecular weight polyethylene glycol | 40 | 10.6 | 16.5 | 6 | 91.9 | 3.33 |
| B | 600 molecular weight polyethylene glycol | 40 | 6.8 | N/A | 7 | 89.2 | 3.33 |

All of the membranes were observed after several days' operation in the cell and found to be free of wrinkles. These examples show that with this coated reinforced membrane, the polyethylene glycol-treated membranes (Ex. A and B) exhibit current efficiencies substantially inferior to that of the untreated control. On the other hand, the dipropylene glycol-1,2, triethylene glycol and diethylene glycol (average CE of two runs) treated membranes exhibit current efficiencies superior to that of the control.

EXAMPLE 23

A 10.2×10.2 cm (4×4 inch) KOH-hydrolyzed sample of the starting membrane used in Examples 14-16 was soaked in 2% solution of sodium hydroxide for 2 hours to convert the membrane to the sodium form. It was then water rinsed and soaked in a 50% aqueous solution of diethylene glycol at 30° C. for 30 minutes. The expanded membrane was then removed from the bath, excess solution removed by blotting with a paper towel, air dried, and equilibrated at 50% relative humidity. The lineal expansion (average of MD and TD) was 13.1%. The membrane was then coated on the cathode side with a $ZrO_2$ containing bubble release layer and installed in a laboratory test cell. This membrane gave 96% current efficiency at 2.95 volts when operated at 32% caustic and 3.1 $kA/m^2$. After 8 days of operation the membrane was removed from the cell and examined found to be very flat and free from wrinkles.

What is claimed is:

1. An optionally reinforced, pre-expanded cation-exchange membrane comprising one or more layers of fluorinated polymer whose functional groups are selected from $-CO_2M$ and $-SO_3M$ where M is H, Na or K, and which membrane contains about 8 to 30% by weight of a swelling agent consisting of a compound or mixture of compounds of the formula

where
- Y=H or CH₃
- and n=2, 3 or 4.

2. A membrane according to claim 1 which comprises at least first and second layers of fluorinated polymer, adjacent said layers being in adherent contact with one another, said first layer being of polymer whose functional groups are —CO₂M groups and said second layer being of polymer whose functional groups are —SO₃M groups, and each said polymer with —CO₂M groups has an equivalent weight of 670 to 1500 and each said polymer with —SO₃M groups has an equivalent weight of 600 to 1500.

3. A membrane according to claim 2 in which said fluorinated polymer is perfluorinated polymer, each said polymer with —CO₂M groups has an equivalent weight of 750 to 1250 and each said polymer with —SO₃M groups has an equivalent weight of 800 to 1400.

4. A membrane according to claim 1 where the swelling agent or mixture thereof is selected from diethylene glycol, triethylene glycol and dipropylene glycol-1,2.

5. A membrane according to claim 2 where the swelling agent or mixture thereof is selected from diethylene glycol, triethylene glycol and dipropylene glycol-1,2.

6. A membrane according to claim 3 where the swelling agent or mixture thereof is selected from diethylene glycol, triethylene glycol and dipropylene glycol-1,2.

7. A membrane according to claim 4 where the swelling agent is diethylene glycol.

8. A membrane according to claim 5 where the swelling agent is diethylene glycol.

9. A membrane according to claim 6 where the swelling agent is diethylene glycol.

10. A reinforced membrane according to claim 1 where the membrane contains about 10–20% by weight of swelling agent(s).

11. A reinforced membrane according to claim 2 where the membrane contains about 10–20% by weight of swelling agent(s).

12. A reinforced membrane according to claim 3 where the membrane contains about 10–20% by weight of swelling agent(s).

13. A reinforced membrane according to claim 4 where the membrane contains about 10–20% by weight of swelling agent(s).

14. A reinforced membrane according to claim 7 where the membrane contains about 10–20% by weight of swelling agent(s).

15. A non-reinforced membrane according to claim 1 where the membrane contains about 10–25% by weight of swelling agent(s).

16. A non-reinforced membrane according to claim 2 where the membrane contains about 10–25% by weight of swelling agent(s).

17. A non-reinforced membrane according to claim 3 where the membrane contains about 10–25% by weight of swelling agent(s).

18. A non-reinforced membrane according to claim 4 where the membrane contains about 10–25% by weight of swelling agent(s).

19. A non-reinforced membrane according to claim 7 where the membrane contains about 10–25% by weight of swelling agent(s).

20. A process for preparing a pre-expanded cation-exchange membrane comprising contacting an optionally reinforced membrane formed from one or more layers of fluorinated polymer whose functional groups are selected from —CO₂M and —SO₃M where M is H, Na or K, with a solution of a swelling agent consisting of a compound or mixture of compounds of the formula $$HO(CH_2CHYO)_nH$$

where
- Y=H or CH₃
- and n=2, 3 or 4.

for a period of time long enough to provide, after air drying, a lineal expansion of at least about 5%.

21. A process according to claim 20 in which the membrane comprises at least first and second layers of fluorinated polymers, adjacent said layers being in adherent contact with one another, said first layer being of polymer whose functional groups are —CO₂M and said second layer being of polymer whose functional groups are —SO₃M groups, and each said polymer with —CO₂M groups has an equivalent weight of 670 to 1500 and each said polymer with —SO₃M groups has an equivalent weight of 600 to 1500.

22. A process according to claim 20 in which said fluorinated polymers is perfluorinated polymer, each said polymer with —CO₂M groups has an equivalent weight of 750 to 1250 and each said polymer with —SO₃M groups has an equivalent weight of 800 to 1400.

23. A process according to claim 20 where the swelling agent is selected from diethylene glycol, triethylene glycol and dipropylene glycol.

24. A process according to claim 23 where the swelling agent is diethylene glycol.

25. A process according to claim 20 where the membrane is reinforced and the lineal expansion is about 7–12%.

26. A process according to claim 20 where the swelling agent is in an aqueous solution and the concentration of swelling agent is about 12 to 70 weight percent.

27. An electrochemical cell which comprises an anode compartment, an anode situated within said anode compartment, a cathode compartment, a cathode situated within said cathode compartment, and, between said compartments, an ion exchange membrane according to claim 1.

28. A method for preparing an electrochemical cell according to claim 27 for use in a chloralkali process comprising (a) introducing water or aqueous brine into said anode compartment and introducing water or aqueous caustic into said cathode compartment, (b) allowing the water, brine or caustic to simultaneously remain in said compartments for a period of time sufficient to remove substantially all of the swelling agent from the pre-swelled cation exchange membrane, (c) removing the water, brine or caustic from the cell, and (d) optionally repeating steps (a), (b) and (c).

* * * * *